United States Patent [19]

Monobe

[11] Patent Number: 4,770,573
[45] Date of Patent: Sep. 13, 1988

[54] CUTTING DEPTH ADJUSTING MECHANISM OF A ROUTER

[75] Inventor: Juzaburo Monobe, Hiroshima, Japan

[73] Assignee: Ryobi Ltd., Hiroshima, Japan

[21] Appl. No.: 108,162

[22] Filed: Oct. 14, 1987

[30] Foreign Application Priority Data

Oct. 15, 1986 [JP] Japan ............................ 61-158675[U]
Aug. 7, 1987 [JP] Japan ............................ 62-121680[U]

[51] Int. Cl.⁴ .............................................. B23C 1/20
[52] U.S. Cl. ............................... 409/182; 144/134 D;
144/136 C; 409/184; 409/210; 409/214;
409/218; 408/241 S
[58] Field of Search ............... 409/175, 178, 181, 182,
409/184, 204, 206, 210, 214, 218; 144/134 D,
136 C; 408/112, 241 S

[56] References Cited

U.S. PATENT DOCUMENTS

2,574,653 11/1951 Miller ............................... 408/241 S
2,664,768 1/1954 Clyne ............................... 408/241 S
4,319,860 3/1982 Beares ............................. 144/134 D
4,445,811 5/1984 Landers .............................. 409/184

Primary Examiner—Gil Weidenfeld
Assistant Examiner—Daniel W. Howell
Attorney, Agent, or Firm—Finnegan, Henderson, Farabow, Garrett and Dunner

[57] ABSTRACT

A cutting depth adjustment mechanism for a router having a nut engaged on a guide bolt for adjusting the depth of cut. Cutting depth can be coursely adjusted without rotation of the guide bolt relative to the adjusting nut. This can be accomplished by either disengaging the adjusting nut from the guide bolt or by releasing the adjusting nut from the main body member and sliding the nut along a longitudinally formed slot in the main body member.

4 Claims, 6 Drawing Sheets

CUTTING DEPTH ADJUSTING MECHANISM OF A ROUTER

BACKGROUND OF THE INVENTION

1. Field of the Invention

The present invention relates to a cutting depth adjusting mechanism of a router for adjusting the depth of cut.

2. Description of the Related Art

A conventional router has a base and a main body. On two sides of the base a pair of columns are disposed uprightly and parallel with each other. The two columns are inserted into two column inserting holes formed in the main body of the router in such a manner that the main body can be moved toward and away from the base. The main body is supported on the base through two springs, each provided in a column and a column inserting hole so that the main body is urged to be separated from the base. A stud or guide bolt is accommodated in the column and the column inserting hole, the stud or guide bolt having a threadably engaged adjusting nut outside the main body.

When a cutting depth adjusting operation is carried out, the adjusting nut must be rotated around the stud or guide bolt many times to move the router to a desired height position. It is very time consuming to rotate the nut to move the router a long vertical distance and rotating the nut is a very cumbersome operation.

It is an object of the present invention to provide a cutting depth adjusting mechanism for a router in which an adjusting operation for adjusting depth of cut can be carried out easily and speedily.

SUMMARY OF THE INVENTION

To achieve the foregoing object, and in accordance with purposes of the invention as embodied and broadly described herein, there is provided a router having a pair of spaced tubular columns attached to and extending axially in a direction substantially perpendicular to the planar surface of a base. A main body member having a pair of spaced openings to slidably receive the pair of tubular columns is further provided. The body member includes chuck means to hold a bit and the body member is adjustable along the axis of the tubular columns for positioning the chuck means relative to the base. An elongated guide means having a threaded shank portion is rotatably mounted in one of the tubular columns and fastened adjacent an end thereof to the base. There is further provided nut means coupled to the body member, the nut means being engagable with the threaded shank portion of the guide means for positioning the chuck means a selected distance from the planar surface of the base. Spring means are disposed in at least one of the tubular columns. The spring means engages the nut means and urges the body member in a direction substantially perpendicular to the planar surface of the base. The nut means includes adjusting means operative to a first and second condition. The adjusting means is operative to a first condition for adjusting the position of the body member along the axis of the tubular columns without rotation of the guide means relative to the nut means for course adjustment of cutting depth. There is further provided means attached to the guide means for rotating the guide means when the adjusting means is in the second condition for fine adjustment of the cutting depth. Finally, there is provided clamping means to clamp the body member relative to the base.

The nature and utility of this invention will be more clearly apparent from the following detailed description of the preferred embodiments when read in conjunction with the accompanying drawings briefly described below.

DESCRIPTION OF THE PREFERRED EMBODIMENTS

To provide a full understanding of the nature and utility of the present invention, a brief discussion of a conventional cutting depth adjusting mechanism of a router will be presented below with reference to FIG. 8.

Figure 8:
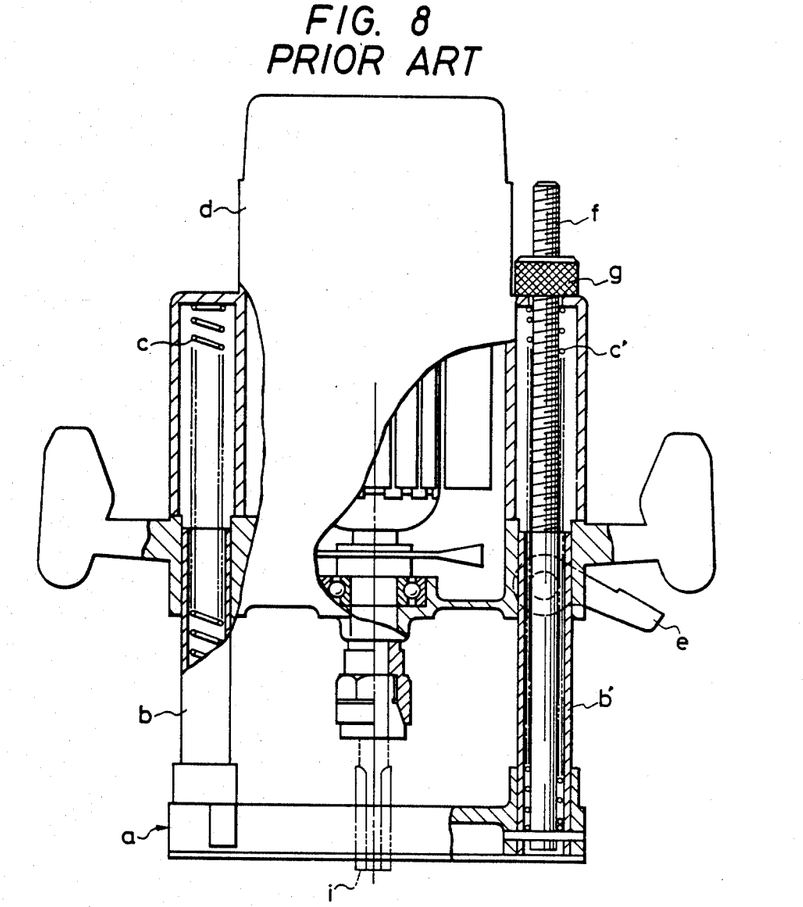
FIG. 8 is a front view partly in section of a conventional prior art router.

In FIG. 8, the base a has a pair of columns b, b' disposed uprightly and parallel to each other. Two coil springs c, c' are disposed in the respective columns b, b' to push upward the main body d of a conventional router. The main body d is vertically slidably engaged with the columns b, b'. In column b', there is a stud bolt f whose upper portion passes through the main body d. The stud bolt f has, at its upper end, a nut g threadably engaged therewith for moving vertically the main body d and the bit i. When the nut g is rotated in one direction, the main body d is moved upward under the spring force of the coil springs c, c'. When the nut g is rotated in other direction, the main body d is lowered compressing the coil springs, c, c'.

To increase the depth of cut, clamp e is loosened and the main body d is pushed downward toward the base a to a desired position. Clamp e is then fastened and the nut g is subsequently lowered by rotating it on member f. Then, the clamp e is loosened and the nut g is rotated for a fine adjustment of the cutting depth. Finally, the clamp e is fastened.

To decrease the depth of cut, first, the nut g is rotated to move the main body d upward away from base a to a desired position. The main body d is pushed upward under the spring force and is stopped at a desired position. Thereafter, the clamp e is fastened and the nut g is subsequently rotated to moved downward until it abuts against the main body d. The clamp e is then loosened and the nut g is rotated for a fine adjustment of the cutting depth. Finally, the claim e is again fastened.

When the cutting depth is adjusted in this manner in a conventional router, the nut g is moved vertically along stud bolt f to a desired position by rotating around the bolt f. This operation requires extensive time and is cumbersome. Further, a large number of steps is required to adjust the depth of cut.

Figure 5A:
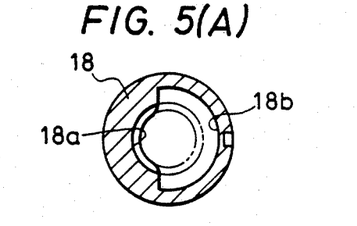
FIG. 5(a) is a cross sectional view of the nut.
Figure 5B:
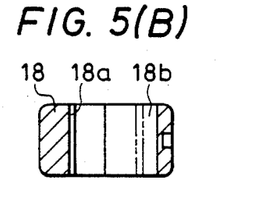
FIG. 5(b) is a longitudinal sectional view of the nut.
Figure 6:
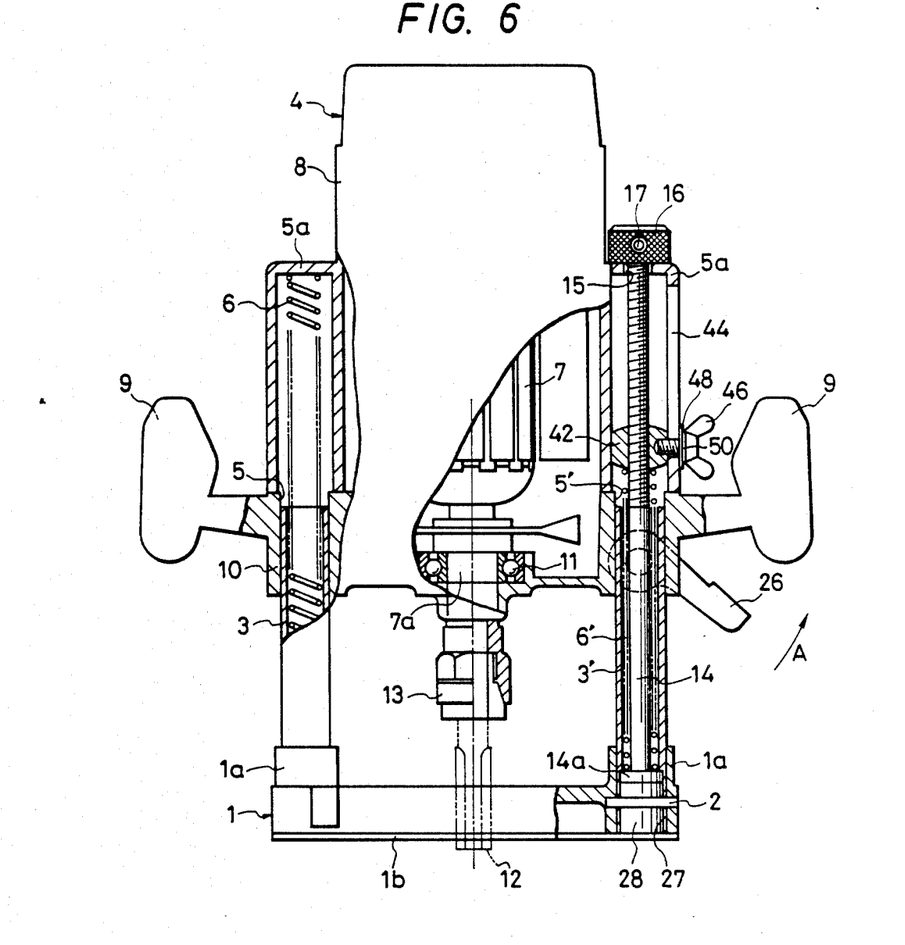
FIG. 6 is a front view partly in section illustrating a second embodiment of the present invention.
Figure 7:
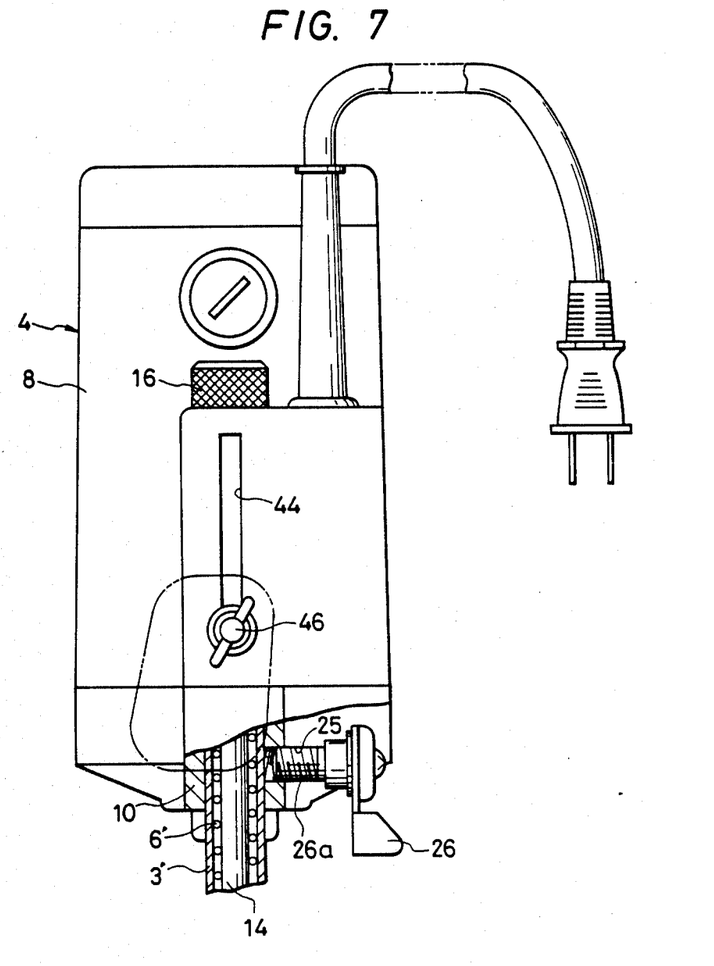
FIG. 7 is a fragmentary side view partly in section illustrating a second embodiment of the present invention.

In view of the above conventional router, the structure of a router according to the preferred embodiments of the present invention will now be explained in detail. A first embodiment is illustrated in FIGS. 1–5(b). A second embodiment is illustrated in FIGS. 6 and 7.

Referring now to FIGS. 1–5(b), the lower ends of a pair of cylindrical columns 3, 3' are engaged on the left and right sides 1a of a base 1. The columns 3, 3' are disposed uprightly and parallel to each other. The lower ends of the columns 3, 3' are held in the base 1 through a stopper pin 2. The base 1 is provided with a bit inserting hole (not shown).

Figure 1:
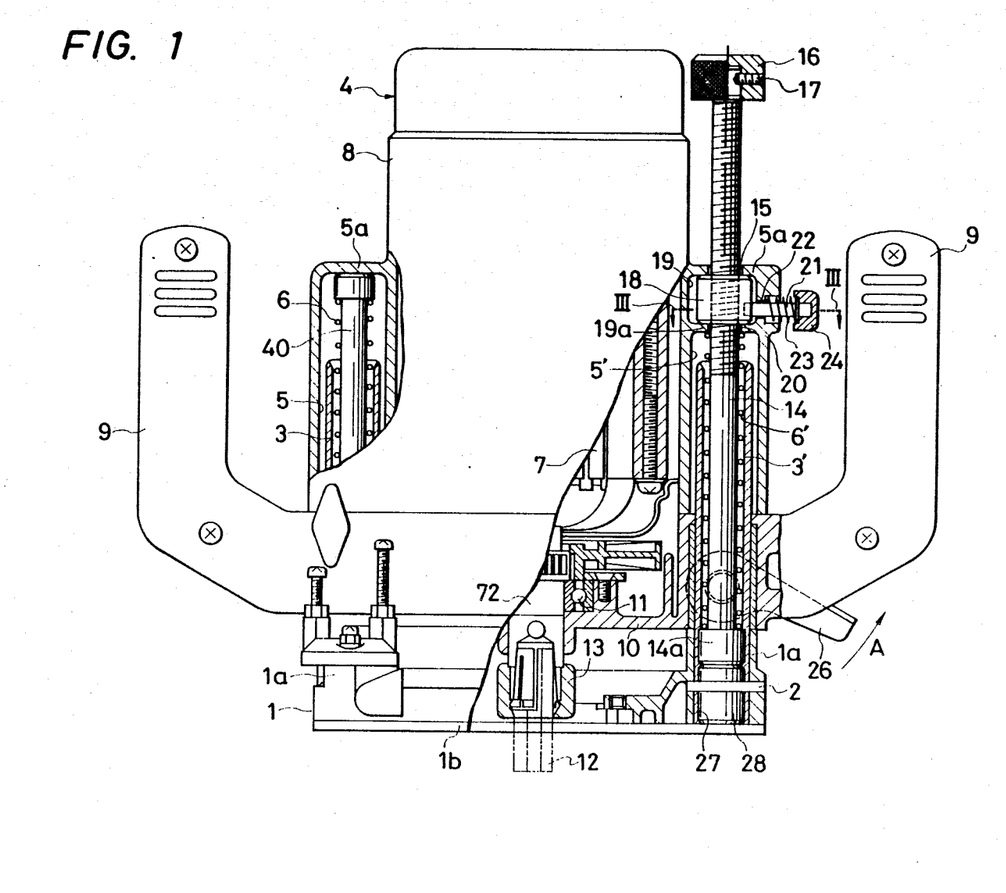
FIG. 1 is a front view of a first embodiment of a router, partly in section illustrating the teachings of the present invention.

The main body 4 of a router is vertically provided with two column inserting holes or chambers 5, 5' for accommodating a pair of columns 3, 3'. The main body 4 can be moved vertically by providing the column inserting chambers 5, 5' with two springs 6, 6' for urging the main body 4.

The main body 4 has a motor case 8 accommodating a motor 7 therein. Integrally fixed to the lower end of the motor case 8 is a support member 10 which has two operating handles 9, 9' projecting outwardly from the left and right sides of the motor case 8. The support member 10 supports a motor axis 7a having at its lower end a chuck 13 for holding and releasing a bit 12.

On column 3, that is, the left column as viewed in FIG. 1, the column inserting chamber 5 has a spring 6 therein which supports, at its upper end, a top wall 5a forming a closing end face of the column inserting chamber 5 through a support axis 40. The lower end of the spring 6 is held by a stopper pin (not shown).

On column 3', that is, the right column as viewed in FIG. 1, the column inserting chamber 5' of the main body accommodates a guide bolt 14 rotatably supported so that the bolt 14 cannot move vertically. The upper portion of the bolt 14 projects upwardly passing through opening 15 formed in the top wall 5a of the column inserting chamber 5'. The bolt 14 supports a knob 16 at its upper end which is fixed to the bolt by a stopper pin 17 for preventing the knob 16 from rotating relative to the bolt 14.

Figure 3:
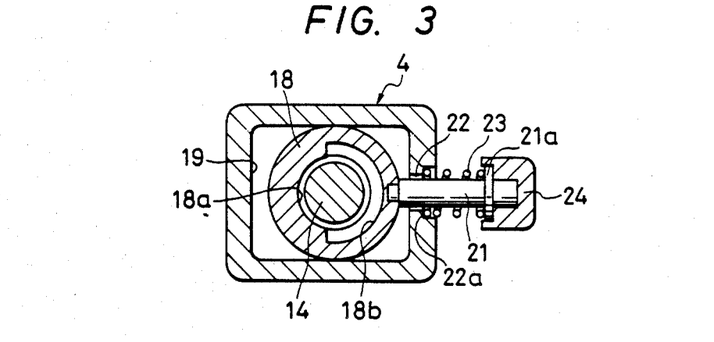
FIG. 3 is a cross sectional view taken along the line III—III of FIG. 1, illustrating an arrangement when the nut is engaged with the guide bolt.
Figure 4:
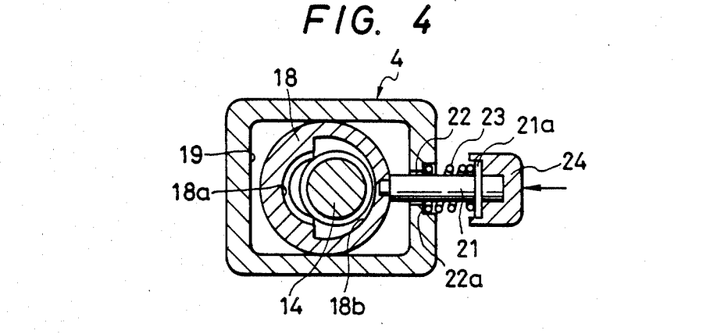
FIG. 4 is a cross sectional view taken along the line III—III of FIG. 1, illustrating a arrangement when the nut is disengaged from the guide bolt.

As shown in FIGS. 3 and 4, the guide bolt 14 is detachably engaged in the lateral direction with an adjusting nut 18. As shown in FIGS. 5(a) and 5(b), the nut 18 has a screw-hole 18a whose half portion is expanded to form a release portion 18b for releasing the threaded engagement between the nut 18 and the guide bolt 14. The release portion 18b of the nut 18 has a larger radius than the radius of the screw threads of the screw hole 18a. The nut 18 is provided in a nut space 19 which is formed at the upper end of the column inserting chamber 5' of the main body 4 coaxially with the column inserting chamber 5'. Further, the nut 18 is accommodated in the nut space 19 so that the nut 18 cannot be moved in the axial direction of the guide bolt 14 but can be moved in the direction perpendicular to the axis of the guide means by at least a sufficient distance through which the nut 18 can be released from the threaded portion of the guide bolt 14.

The guide bolt 14 extends through a hole 20 into the nut space 19 and then through hole 15 in the top 15a of chamber 5'. The spring 6' is provided around the guide bolt 14 in the column inserting chamber 5' of the column 3 in a manner that the upper end of the spring 6' engages the bottom wall 19a of the nut space 19 while the lower end thereof engages the head 14a of the guide bolt 14.

From the outer wall of nut 18, corresponding to the release portion 18b, an adjusting pin 21 integrally extends in the lateral direction relative to the axis of the guide bolt. The adjusting pin 21 slidably passes through a lateral hole 22 formed in a side wall of the nut space 19. A compression spring 23 is provided around the adjusting pin 21 for urging the nut 18 in a direction to be engaged with the guide bolt 14, whereby the nut 18 is held at a position where the nut 18 is threadably engaged with or fixed to the guide bolt 14.

In the drawings, the lateral hole 22 is provided with a step while the outer end portion of the adjusting pin 21 has a shoulder portion 21a. The compression spring 23 is provided around the adjusting pin 21 so that one end of the spring 23 abuts against the step portion 22a of the lateral hole 22 and the other end thereof abuts against the shoulder portion 2la in order to urge the nut 18 and the adjusting pin 21 in the direction indicated by the arrow in FIG. 4. The adjusting pin has, at its projecting end, a shock absorbing knob 24 made of rubber, soft plastic or the like.

Figure 2:
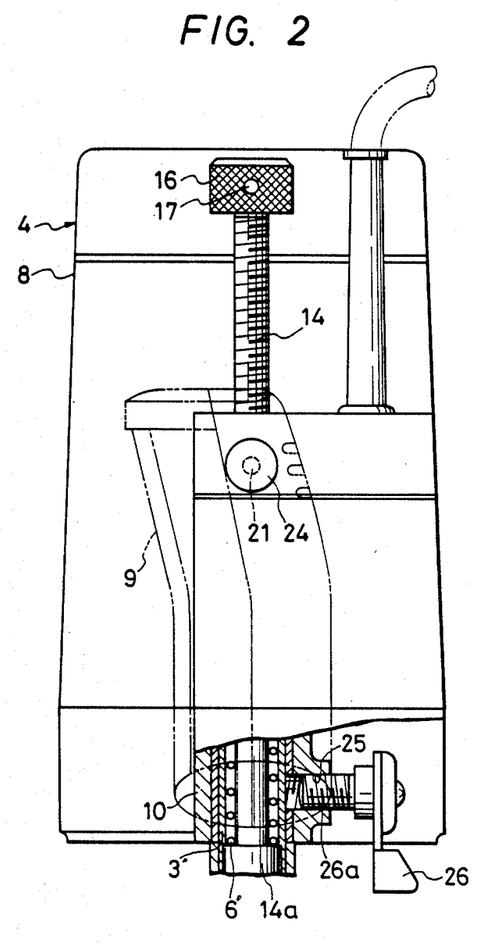
FIG. 2 is an enlarged side view of the first embodiment of the router, partly in section illustrating the teachings of the present invention.

As shown in FIG. 2, the support member 10 of the main body 4 is provided with a laterally extending screw hole 25 connected to the column inserting hole 5'. The screw portion 26a of a clamp lever 26 is threadably engaged with the screw hole 25 to thereby releasably connect the main body 4 with the column 3'.

In this first preferred embodiment, at the lower end of the column 3, a hole 27 is provided having a step with which the head 14a of the guide bolt 14 is engaged. A spacer 28 is disposed in the lower portion of the hole 27 and fixed inside the hole 27 by the stopper pin 2 supported in the base 1. However, means for determining the location of the guide bolt 14 in its axial direction and preventing the guide bolt 14 from moving upwardly is not limited to this mechanism. Other means may be used if they can rotatably support the guide bolt 14 at a predetermined position.

An operation for changing or adjusting the depth of cut according to an adjusting mechanism of this first embodiment of the present invention will now be described.

To increase the cutting depth, the clamp lever 26 is rotated in the direction indicated by an arrow A in FIG. 1 to loosen the engagement between the column 3' and the main body 4. Thereafter, the adjusting pin 21 is pushed inward against the repulsive force of the spring 23 to release the nut 18 from the guide bolt 14. Now the main body 4 can be pushed downwarn to a predetermined position against a spring force. If the adjusting pin 21 is released after the main body 4 is pushed downward to a predetermined position, the nut 18 is pushed back by the spring force thereby to engage with the guide bolt 14. In the next step, the guide bolt 14 is rotated by the knob 16 to move the main body 4 relative to the base 1 for fine adjustment of the cutting depth. Thus, a cutting depth can be coursely and finely adjusted. After the cutting depth is adjusted to a predetermined distance in this manner, the clamp lever 26 is rotated in a direction opposite to that indicated by the arrow A in FIG. 1 to fix the column 3' on the main body 4.

When the depth of cut is decreased, the clamp lever 26 is operated to loosen the engagement between the column 3' and main body 4 and the adjusting pin 21 is pushed inward to release the nut 18 from the guide bolt 14. Subsequently, the main body 4 is pushed upward by the springs 6, 6'. When the main body 4 is located in a predetermined position, the adjusting pin 21 is released to engage the nut 18 with the guide bolt 14. Then, the knob 16 is operated to rotate the guide bolt 14 for fine adjustment of the cutting depth. Next, the clamp lever 26 is rotated to fix the column 3' on the main body 4. In this manner the cutting depth of the bit 12 can be adjusted freely.

According to this embodiment, an adjusting operation can be carried out more simply and speedily than that of the conventional routers. Further, operations for fastening and releasing the engagement between the nut 18 and the guide bolt 1 and between the main body 4 and the column 3' can be carried out remarkably rapidly and easily by pushing and releasing the adjusting pin 21 and rotating the clamp lever 26. In contrast, when the cutting depth is decreased in a conventional router, a nut is moved to a desired position beforehand and thereafter a main body is moved there. Thus, a conventional adjusting operation requires more time than that of the present invention.

A second embodiment of the present invention will now be explained with reference to FIGS. 6 and 7. For simplicity, members of the second embodiment corresponding to those of the first embodiment are indicated by the same numerals as those of the first embodiment.

In this second embodiment, the top wall 5a of the left column inserting hole 5 is directly supported by the upper end or the spring 6. The guide bolt 14 passing through the right column inserting hole 5' has a threadably engaged adjusting nut 42 which is vertically slidably disposed in the hole 5'. The spring 6' abuts at its upper end against the lower face oi the nut 42 and, at its lower end, against the head 14a of the bolt 14. The springs 6, 6' urge the main body 4 upwardly.

A side wall of the hole 5' is provided with a vertical slit 44 through which a thumbscrew 46 passes laterally via a flat washer 48 and a spring washer 50. The inner end of the screw 46 is threadably engaged with a side wall of the nut 42. The screw 46 functions to stop the nut 42 at a desired position within the vertical slit 44.

An adjusting operation of the second preferred embodiment will now be described.

When the cutting depth is increased, first, the clamp lever 26 is rotated in the direction of the arrow shown in FIG. 1 to loosen the engagement between the column 3' and the main body 4. Thereafter, the screw 46 is loosened to release the main body 4 from the nut 42 and the main body 4 is then moved downward to a desired position against the spring force of the spring 6'. In the next step, the screw 46 is fastened to fix the nut 42 onto the main body 4 and the bolt 14 is then rotated by the knob 16 so that the bolt 14 is moved upwardly together with the base 1 and the columns 3,3' with respect to the nut 42 and the main body 4. This allows for fine adjustment of the cutting depth. After the cutting depth is adjusted in this manner, the clamp lever 26 is rotated in a direction opposite to the direction of the arrow indicated in FIG. 1 to fasten the main body 4 on the column 3'.

When the cutting depth is decreased, the clamp lever 26 is operated to release the main body 4 from the column 3' in the above described manner. Thereafter, the screw 46 is rotated to release the main body 4 from the nut 42. This results in the main body 4 being pushed upward under the spring force. The main body 4 is stopped at a desired position and, thereafter, the nut 42 is fixed onto the main body 4 by fastening the screw 46. Next, the bolt 14 is rotated by the knob 16 for a fine adjustment. Lastly, the main body 4 is fixed onto the column 3' by the operation of the clamp lever 26.

When the cutting depth is adjusted in this second embodiment, the nut 42 is located at a certain height position by loosening screw 46 and sliding the screw along the vertical slit 44. Accordingly, it is not necessary for the nut 42 to be rotated by hand at that time. A nut of a conventional router, corresponding to the nut 42 of this embodiment, must be moved vertically by hand rotation for a distance corresponding to the cutting depth adjustment of the cutting depth. The vertical movement of the conventional nut requires a significant amount of time and is very cumbersome. In contrast, the cutting depth can be adjusted rapidly and simply in this second embodiment of the present invention.

What is claimed is:

1. A cutting depth adjusting mechanism for a router, comprising:

a base member having a planar surface;

a pair of spaced tubular columns attached to and extending axially in a first direction substantially perpendicular to the plane of said base;

a body member having a pair of spaced chambers, each disposed to slidably receive one of said pair of tubular columns, said body member including chuck means for holding a bit in a fixed position relative thereto, said body member being adjustable along the axis of said columns for positioning said chuck means relative to said base member;

an elongated guide means rotatably mounted in one of said tubular columns and fastened adjacent an end thereof to said base member, said elongated means including a threaded shank portion;

nut means coupled to said body member and threadably engagable with said threaded shank portion for positioning said chuck means a selected distance from said planar surface;

spring means disposed in at least one of said tubular columns, said spring means engaging said nut means for urging said body member in said first direction relative to said base member;

said nut means including adjusting means operative to a first and second condition, said adjusting means being operative to said first condition for adjusting the position of said body member along the axis of said tubular columns without rotation of said guide means relative to said nut means for course adjustment of said chuck means;

means attached to the guide means for rotating said guide means relative to said nut means at times when said adjusting means is in said second condition for fine adjustment of said chuck means; and clamping means for clamping said body member relative to said base member.

2. The cutting depth adjusting mechanism recited in claim 1, wherein the nut means includes a nut having a central opening with internal threads extending around a portion of the peripheral surface of said central opening, said opening having an unthreaded portion for receiving the threaded shank portion of the guide means at times when said threaded shank is disengaged from said internal threads; and means for moving said nut relative to the shank of said guide means in a direction substantially perpendicular to the axis of said guide means for disengaging said internal threads from said threaded shank portion.

3. The cutting depth mechanism recited in claim 1, wherein the nut means includes a nut having internal threads for threadably engaging the threaded shank portion of the guide means and further includes means for adjustably postioning said nut means along the axis of said tubular columns without rotation of the nut means relative to the threaded shank portion.

4. The cutting depth adjusting mechanism recited in clai m 3, wherein the adjustable positioning means includes a longitudinally extending slot formed in the body member and axially aligned with the tubular columns, and friction screw means threadably engaged with said nut and extending through said slot for selectively positioning the nut in said slot.

* * * * *